Nov. 23, 1926.
C. H. WESTEN
ANTIVIBRATION DEVICE
Filed August 3, 1923    2 Sheets-Sheet 1
1,607,655
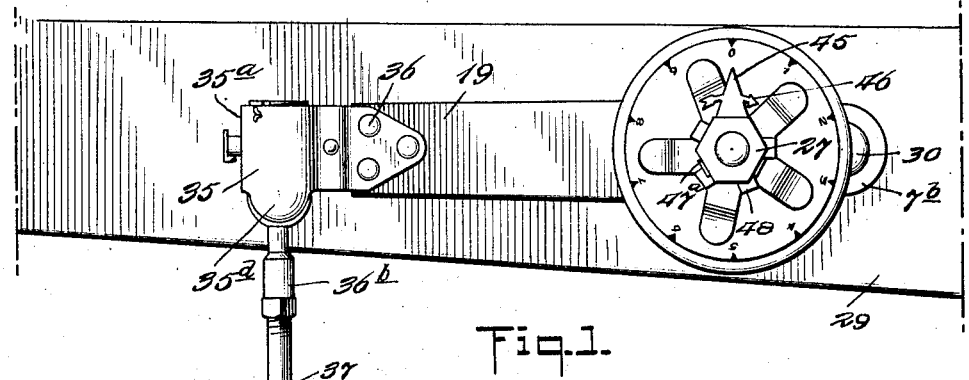
Fig.1.
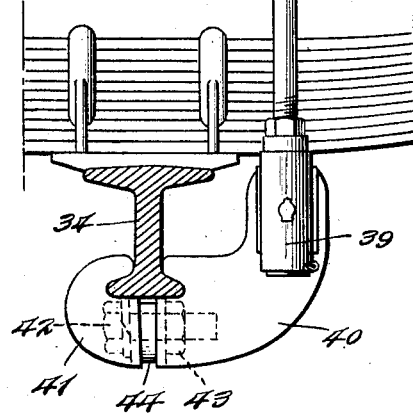
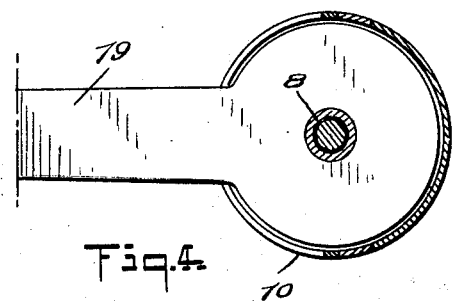
Fig.4.
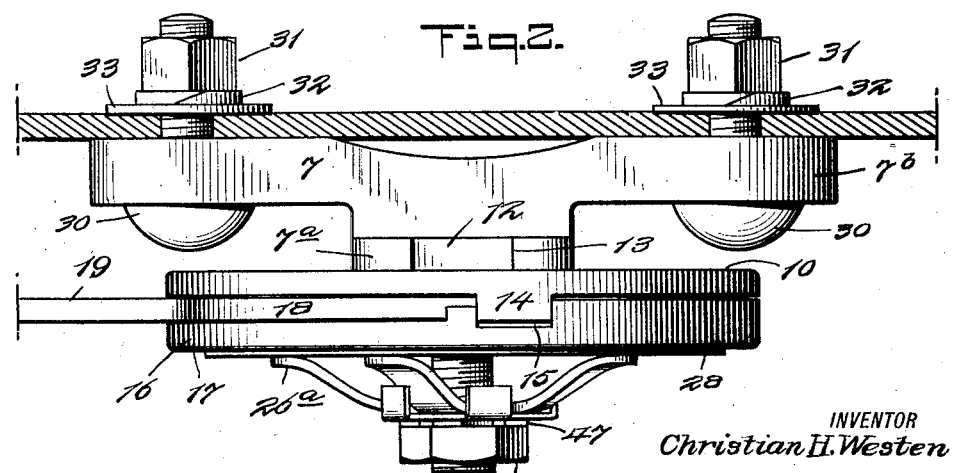
Fig.2.
INVENTOR
Christian H. Westen
BY
ATTORNEYS Nov. 23, 1926.
C. H. WESTEN
ANTIVIBRATION DEVICE
Filed August 3, 1923    2 Sheets-Sheet 2
1,607,655
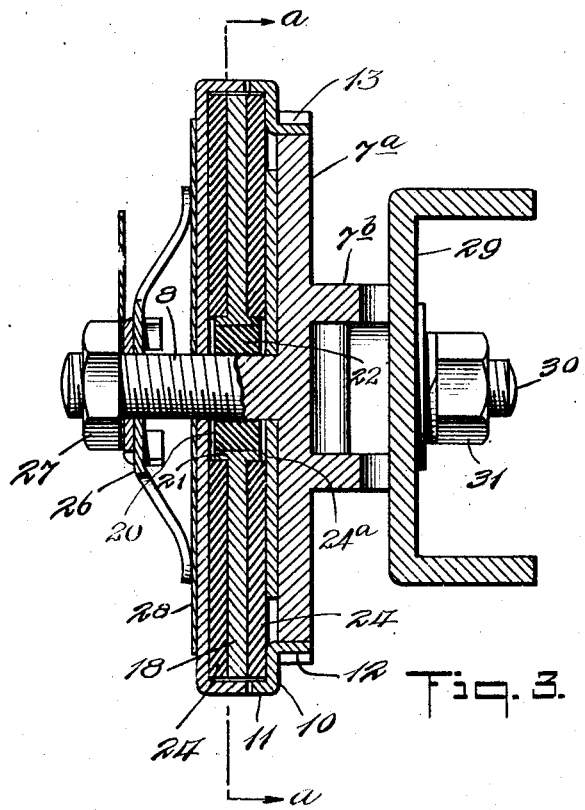
INVENTOR
Christian H. Westen
BY
ATTORNEYS Patented Nov. 23, 1926.

1,607,655

UNITED STATES PATENT OFFICE.

CHRISTIAN H. WESTEN, OF NEWARK, NEW JERSEY, ASSIGNOR TO EDWARD V. HARTFORD, INC., OF JERSEY CITY, NEW JERSEY, A CORPORATION OF NEW YORK.

ANTIVIBRATION DEVICE.

Application filed August 3, 1923. Serial No. 655,414.

The present invention relates generally to improvements in anti-vibration devices and is more especially directed to those devices which are more commonly known as shock absorbers or spring controllers as used in vehicle construction.

In motor vehicle construction it is well known that the suspended parts, which are usually connected by means of laminated springs, have a relative movement caused by the deflection of the springs when the vehicle is passing over undulations or other irregularities in the roadbed. These relative movements are of varying periods and different degrees of intensity and, when the vehicle traverses a roadway which has depressions or other irregularities in its surface, the relative movements of the suspended parts are frequently of a severity and duration which cause considerable discomfort to the occupants of the vehicle and also produces undue wear and tear in the various mechanisms of the latter.

Therefore, to counteract the forces liberated by the vehicle spring action, it has been the practice to provide various forms of controlling devices whereby the compression and recoil of the springs may be governed and the period of vibration reduced so as to minimize the shocks and jars transmitted to the suspended parts.

One of the well known devices for controlling the action of the vehicle springs is the Hartford shock absorber, which is of the so-called friction type and comprises a plurality of elements associated so as to interpose a frictional resistance to the action of the vehicle springs and thereby retard or slow their movement.

In one form of construction of the aforesaid Hartford shock absorber, certain friction elements are fixedly mounted on one of the suspended parts of the vehicle, while a movable friction element associated with these fixedly mounted elements is connected to another part of the vehicle so that, as the suspended parts approach and recede from each other during the compression and recoil of the spring of the vehicle, these elements moving in frictional contact exert a retardative effect on the spring action and decrease the vibration so that the shocks or jars transmitted to the suspended parts are greatly minimized, if not entirely eliminated.

The general object of the present invention is to provide a shock absorber of the aforesaid friction type of a simplified construction, whereby it may be more economically produced and at the same time will possess a higher degree of durability than has heretofore been attainable in antivibration devices of the various types.

A further object of this invention is to provide a means of connection between the movable friction element of the device and a part of the vehicle which will be capable of a universal movement whereby, irrespective of the relative movements of the suspended parts of the vehicle, the force for operating said movable element of the shock absorber will at all times be transmitted to the actuating member thereof in a substantially direct line. Furthermore, by the provision of this means of connection it is possible to apply the shock absorber to certain types of vehicle constructions where efficient performance of the shock absorber could not be obtained by other attaching mediums known in the art.

Another object of this invention is to provide a shock absorber of the aforesaid friction type whereby both the compression and recoil movements of the vehicle springs are positively retarded or controlled, the resistance set up by the shock absorbing device progressively increasing in proportion to the deflection of the vehicle springs.

Other objects and advantages flowing from the improved construction disclosed herein will be apparent from the following detailed description of the construction and operation of this invention and it will be understood that I reserve unto myself all rights, to the full range of equivalents both in structure and in uses, to which I may be entitled under my invention in its broadest aspect.

For the purposes of my disclosure I have elected to illustrate and describe a preferred embodiment of my invention whereby those skilled in the art may readily ascertain the manner in which my invention may be carried out to accomplish the objects, as heretofore set forth.

In the drawings:

Fig. 1 is a view in elevation, partly in section, of portions of the suspended parts of a motor vehicle of a conventional design illustrating an anti-vibration device, made in accordance with my invention, attached thereto;

Fig. 2 is an enlarged view of the shock absorber as shown in Fig. 1, viewed from the top thereof, showing in detail the method of attaching the same to the frame of the vehicle;

Fig. 3 is a transverse section of the shock absorber disclosing the relative positions of the associated parts when the device is attached to the vehicle frame;

Fig. 4 is a sectional view taken on the line a—a of Fig. 3;

Fig. 5 is a transverse section of a portion of the means of connection between the arm or extension of the movable friction element and the axle of the vehicle;

Fig. 6 is a plan view of the socket member shown in Fig. 5 as blanked out and prior to the formation of the socket therefrom; and Fig. 7 is a fragmentary detail of the lower end of the connection between the aforesaid arm or extension of the movable friction element and the axle of the vehicle.

Referring now to the drawings in detail, in which like characters of reference are employed to indicate similar parts throughout the several views: 7 indicates the base or supporting member of the shock absorber, which is preferably of a cruciform shape and of cast metal. Formed integral with this base or supporting member and projecting from the center of the arm 7ª thereof, is a stud 8, which is adapted to pass through an aperture 9 in the annular plate 10 having a peripheral flange 11. In order to prevent rotation of said plate 10 with respect to the base or supporting member 7, I provide the former with lugs 12 which are preferably struck up from the outer surface thereof and which are adapted to seating in the recesses 13 provided at the opposite extremities of the cross arm 7ª of said base member 7.

As will be observed, the peripheral flange 11 of the plate 10 is provided with substantially oppositely located ears 14 which are adapted to enter the slots 15 provided in the peripheral flange 16 of the annular plate 17. By this arrangement it will be evident that the plates 10 and 17 are held against relative rotary movement,—the slots 15 being of a slightly greater depth than the ears 14 on the flange of the plate 10 so as to permit of a predetermined movement of the plate 17 longitudinally of the stud and for the purposes hereinafter described.

Located intermediate of the plates 10 and 17 and rotatable on the stud 8 is an annular plate 18 having a preferably integrally formed arm or extension 19. This plate 18 is formed with a centrally located aperture 20 of substantially greater diameter than the stud 8 within which aperture is located a collar 21, which extends beyond the opposite surfaces of said plate and which contains a bushing 22 of anti-friction material, the latter forming a bearing for said plate 18 when mounted on the stud 8.

Disposed on each side of the plate 18 is an annular disc 24 formed of wood or other suitable friction material, which discs are respectively contained within the members 10 and 17, the extending portions of the collar 21 rotating freely within the apertures 24ª of said discs 24.

From the foregoing description, it will be seen that the elements 10, 17, 18 and 24 will be maintained in axial alignment upon and by the stud 8, the elements 10 and 17 being fixed against rotation while the element 18 is free to rotate on said stud and within the limits of the circumferential slot provided between the members 10 and 17 by cutting away a portion of the flange 16 of the latter. Obviously, the discs 24, which are contained within the flanged plates 10 and 17, are capable of rotation under the influence of the plate 18, the degree of their rotary movement being dependent upon the pressure applied to the parts by means of a suitable tensioning device 26, which is preferably in the form of a spider spring, as shown. This tensioning device is carried on the stud 8 and its radial arms or extensions 26ª are of a length, and so conformed, as to bear and exert pressure upon the outer face of the flanged plate 17 in a zone adjacent to its circumference, whereby all of the aforesaid cooperating frictional elements may be maintained in functioning relation through the medium of the securing nut 27 threaded onto the end of the stud 8.

The shock absorber is rigidly connected to the frame member 29 of the vehicle through the medium of the aforesaid base member 7, which functions as a bracket, the cross arm 7ᵇ of the base member being apertured at each end to receive the bolts shown at 30. These bolts are preferably formed with square shoulders which conform to the configuration of the apertures in the cross arm 7ᵇ of the base member 7 and extend through holes or openings drilled or punched in the frame 29 of the vehicle, so that the said cross arm 7ᵇ may be rigidly clamped to said vehicle frame by means of the securing nuts 31 and lock washers 32, flat washers 33 being preferably inserted between the web of the frame and the lock washers 32 to insure absolute rigidity in the mounting.

The arm or extension 19 of the annular plate 18, when the base member 7 has been connected to the frame 29 of the vehicle, as just described, is connected to the axle through the medium of a link which is capable of universal movement and which is so constructed as to insure positive and constant frictional contact of the opposed surfaces of the friction elements without regard to the relative movements of the frame member 29 and the axle 34 of the vehicle. The aforesaid means of connection between the arm or extension 19 and the axle 34 of the vehicle comprises a socket member 35, which is stamped out of sheet metal in the form of the blank shown in Fig. 6 and by successive press operations is shaped, as shown in Fig. 1. It will be noted that this socket member has a cylindrical body portion 35ª formed by riveting together the surfaces 35ᵇ of the blank, the ends 35ᶜ of the blank being expanded or separated so as to straddle the end of the arm or extension 19 to which they are rigidly secured by means of rivets or the like 36.

The cylindrical body portion 35ª forms a socket for the ball 36ª of the ball stud 36, the dependent ears 35ᵈ being shaped to conform to the contour of the surface of the ball and providing a bearing therefor. It will be noted that the lower end of the shank of said ball stud 36 is internally threaded for engagement with the threaded end of the rod or lever 37, the said rod or lever and the said ball stud 36 being adapted to be locked in threaded engagement by means of the lock nut 38 functioning in the usual manner. The other extremity of the rod or lever 37 is similarly connected to the socket 39, which is of the conventional type of socket employed in drag link construction, this latter socket being connected to a ball stud projecting from the side of the bracket member 40, which cooperates with the bracket member 41 in a manner whereby said members may engage and be firmly clamped to the axle 34 by means of the bolt 42 and securing nut 43 employed in conjunction with suitable lock washers and a spacer 44 in such cases as the latter may be required.

In the assembly of the link as just described, it will be observed that the dependent portions or ears 35ᵈ of the socket member 35 are diametrically opposite and their ends are spaced sufficiently to permit of the shoulder 36ᵇ of the ball stud to pass therethrough when inserted from the upper end of the socket so that suitable connection may be made with the aforesaid rod or lever 37. When the ball stud 36 has been located within the socket 35, as described, the cup or retainer 39 is placed in position upon the same, a suitable tensioning device, such as a spring 40 or a lock washer, is then disposed upon the cup, the parts being held in assembled relation by means of the usual plug 41, which is threaded into the end of the socket 35. It is obvious that by adjusting the plug 41 the tension of the spring 40 or other tensioning device may be regulated so as to retain the ball end of the stud 36 in position to properly function at all times,
the plug 41 being locked in adjusted position by any suitable means, such as by a cotter pin 42 passing through openings 42 in the rim of the socket 45 and through the customary screw-driver slot provided in the top of plugs of the type shown.

When the shock absorber is mounted on the vehicle frame and the arm 19 thereof connected to the axle 34 in the manner just described, the friction elements carried by the stud 8 are placed under a predetermined degree of tension by adjusting the nut 27 on said stud, as aforesaid. To facilitate adjustment, and in order that substantially the proper degree of tension may be obtained in vehicles of different weight or spring action, I locate a relatively thin circular plate 28 on the outer face of the flanged plate 17, upon which the extremities of the radial arms 26ª of the plate 26 are adapted to bear. This plate 26 is provided with suitable indicia to show the approximate resistance in pounds which is interposed by the shock absorber to the relative movement of the vehicle parts to which it is connected. A pointer 45 embodying an arrow 46, indicating the direction of rotation, extends from a preferably hexagonal plate 47, which is mounted on the stud 8 and provided with upturned ears 47ª to engage the faces of the nut 27 so as to rotate therewith. The underside of the plate 47 is formed with a plurality of notches or depressions which are adapted to be engaged by radial depressions on the substantially star shaped plate 48. The latter plate 48 is formed to fit upon the body portion of the plate 47 and has the ends of its respective arms disposed in a plane to lie between the arms 26ª of the tensioning device. As will be apparent, the notches in the plate 47 riding over the projecting surfaces of the plate 48 will permit of a graduated or step by step movement of the securing nut 47 so that an accurate and quick adjustment may be obtained, even by a novice; also, it will be evident that the aforesaid notches and projections will serve to effectively lock the nut 27 against rotation when the proper adjustment has been made.

In the operation of my device, it will be obvious that the friction elements are maintained in constant frictional contact by the tensioning device 26, and that a resistance will be interposed to the relative movement of the vehicle parts, to which the device is attached, both on the compression and recoil of the vehicle spring. When the vehicle is passing over minor obstructions or undulations in the road bed, the frictional resistance to the relative movement of the vehicle parts will be less than where the obstructions or obstacles produce relatively greater movement of the suspended parts. In the practical application of my invention, I have found that my device interposes a frictional resistance to the movement of the vehicle parts which varies proportionately with the deflection or movement of the vehicle springs. For instance, it will be assumed that the vehicle and shock absorber parts are in the position shown in Fig. 1, the vehicle spring being in its normal or neutral position and the friction elements of the shock absorber being under tension to produce an initial resistance of thirty pounds to the relative movement of the vehicle parts. It will be apparent, therefore, that the compression of the vehicle spring will produce an upward movement of the arm 19. As this arm or extension moves upwardly, the angle between the said arm and the connection to the axle 34 is contracted and the force of leverage is coincidently reduced so that the resistance offered by the shock absorber to the spring movement is increased proportionately to the deflection of the springs, and effectively retards or slows the upward or compression movement of the vehicle springs. On the other hand, as the spring expands or recoils, it is obvious that the greatest resistance will be interposed at the point where the liberation of the energy stored up by the compression of the spring is initiated, the resistance offered to the expansion of the spring diminishing proportionately as the energy of the spring is spent or dissipated.

By constructing the connection between the arm 18 and the bracket 40, attached to the axle, as shown, it will be evident that I am enabled to obtain a much greater angular movement in all directions than is possible of attainment by any existing forms of drag links or semi-universal joints as known in the shock absorber art. The ball 36ª by reason of the configuration of the socket member 35, may be of much larger diameter than could otherwise be used and by forming the ears or retaining members 35ᵈ on diametrically opposite sides of the socket member, the link 37 has a range of movement through an arc of substantially 130 degrees, which is far in excess of any movement which is required in the application of my device to any known vehicle construction where it is possible to attach the shock absorber thereto as shown in Fig. 1. Therefore, where the vehicle construction makes it necessary, the shock absorber may be mounted on the frame so that the angle between the arm 19 and the link 37 is greater or less than 90 degrees and the device will function with the same efficiency as in the preferred form of application, shown in Fig. 1. To provide for relative lateral movement of the suspended parts of the vehicle, the link 37 is capable of movement through an arc of approximately 30 degrees. This provides a high factor of safety for the device, as it is well beyond the limit of any possible relative movement in a lateral direction of the connected vehicle parts as at present constructed.

From the foregoing description of my invention, it will be manifest that I have produced a compact structure which may be economically produced and installed. The plates 10, 17 and 18 are preferably stamped from sheet metal but, of course, may be castings or may be made of any material suitable to the purpose for which said parts are designed. The friction washers 24 are preferably formed of the well known arguto wood which possesses a high degree of durability and, when associated with the metal plates 10, 17 and 18 produce a frictional resistance which is highly efficient in the operation of my device. It will be understood, however, that I do not confine myself to arguto wood for these parts as they may be made of brass or any other suitable material which will serve to carry out the objects of my invention.

While I have described the drag link connection between the shock absorber arm 19 and the bracket 40 as applied to the specific structure herein shown, it will be obvious that it may be employed for any purpose where a universal or semi-universal connection is necessary or desired. For instance, my improved form of drag link will overcome many of the disadvantages which reside in present drag link constructions as employed in connection with the steering mechanism of motor vehicles. The ability to form the connecting link 37 of solid stock will give much greater strength and durability to the drag link as a whole than is possible of attainment in the present tubular drag links and it will be obvious that a drag link of any over-all length may be provided by using rods or links of different lengths. Furthermore, the ball and socket joint at each end of the drag link may be of the same construction as that carried by the arm 19 of the shock absorber herein shown, which will materially reduce the effort required to function the drag link in the steering of the vehicle.

In the present description of my invention I have necessarily confined myself to the specific structure shown in the drawings, but it will be apparent to those skilled in the art that various changes in the details thereof may be made without departing from the spirit and scope of my invention.

What is claimed is:

1. An anti-vibration device comprising a pair of plates having peripheral flanges formed with interlocking surfaces to prevent relative rotation of said plates, a bracket for supporting said plates from a vehicle part, said bracket having an integrally formed stud providing a mounting for said plates, means for detachably locking one of said plates to said bracket, a plurality of friction elements interposed between said plates, means for maintaining the opposed surfaces of said friction elements in constant engagement, and means for connecting one of said friction elements to another part of the vehicle.

2. An anti-vibration device for motor vehicles and the like comprising a base member of a substantially cruciform configuration, means for rigidly connecting one of said cross-arms thereof to a vehicle part, a pair of spaced annular plates formed with interlocking means to prevent relative rotation thereof supported from the other cross-arm of said base member, one of said plates being locked against rotation relative to said latter cross-arm, means for maintaining said plates in axial alinement on said base member, a frictional element disposed between said plates, a tensioning device carried by said latter means for maintaining said plates and said element in constant frictional contact, means for varying the tension of said device and a connection between said frictional element and another part of the vehicle capable of substantially universal movement, whereby said device will function to control the relative movement of the vehicle parts to which it is connected.

CHRISTIAN H. WESTEN.